(12) United States Patent
Cooper et al.

(10) Patent No.: US 6,776,590 B2
(45) Date of Patent: *Aug. 17, 2004

(54) DYNAMO ELECTRIC MACHINES AND STATORS FOR USE IN SAME

(75) Inventors: David J. Cooper, Tustin Ranch, CA (US); Gary F. McKee, Newport Beach, CA (US); Mike Saveliev, Huntington Beach, CA (US); Patrick J. Weaver, Anaheim, CA (US)

(73) Assignee: SHURflo Pump Manufacturing Company, Inc., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/077,590

(22) Filed: Feb. 15, 2002

(65) Prior Publication Data

US 2002/0150486 A1 Oct. 17, 2002

Related U.S. Application Data

(63) Continuation of application No. 09/533,320, filed on Mar. 22, 2000, now Pat. No. 6,347,929, which is a continuation of application No. 08/906,847, filed on Aug. 6, 1997, now Pat. No. 6,132,186.

(51) Int. Cl.[7] .......................... F04B 17/00; H02K 21/12; H02K 15/12
(52) U.S. Cl. .............. 417/423.7; 310/156.32; 310/156.36; 310/44
(58) Field of Search ............... 417/423.7; 310/156.32, 310/156.36, 156.33, 156.34, 156.35, 156.37, 44, 268, 43

(56) References Cited

U.S. PATENT DOCUMENTS

| | | |
|---|---|---|
| 2,782,721 A | 2/1957 | White |
| 3,433,163 A | 3/1969 | Sheets et al. |
| 3,597,117 A | 8/1971 | Zoehfeld |
| 3,618,337 A | 11/1971 | Mount |
| 3,767,330 A * | 10/1973 | Signorile .................... 417/420 |

(List continued on next page.)

FOREIGN PATENT DOCUMENTS

| | | |
|---|---|---|
| DE | 19622286 | 11/1996 |
| DE | 19646617 | 5/1998 |

(List continued on next page.)

OTHER PUBLICATIONS

Zhang et al.; "Analysis and Experimental Validation of Performance for and Axial Brushless Permanent Magnet DC Motor with Powered Iron Metallurgy Cores"; Manuscript received on Feb. 4, 1997, Conference held on Apr. 1–4, 1997.*

(List continued on next page.)

Primary Examiner—Justine R. Yu
Assistant Examiner—Timothy P. Solak
(74) Attorney, Agent, or Firm—Michael Best & Friedrich LLP

(57) ABSTRACT

Dynamo electric machines and stators for use in such machines are provided. The stators comprise plates configured to be substantially flat and a plurality of spaced apart projections or teeth extending away from the plate and, together with the plate defining a plurality of slots therebetween. The stators comprise masses of metal particles. Using stators made from such metal particles provides enhanced machine efficiency, which is believed to be because of reduced eddy current effects in the stator. Motors including rotors having generally flat arrays of permanent magnetic poles and such stators which are spaced apart from and generally facing the permanent magnetic poles and have a plurality of magnetic windings, and pumps powered by such motors are included within the scope of the present invention.

21 Claims, 8 Drawing Sheets

U.S. PATENT DOCUMENTS

| | | | |
|---|---|---|---|
| 3,831,062 A | | 8/1974 | Haug et al. |
| 3,869,626 A | * | 3/1975 | Puttock et al. ............... 310/152 |
| 3,974,406 A | | 8/1976 | Wehde |
| 4,242,039 A | | 12/1980 | Villard et al. |
| 4,255,494 A | | 3/1981 | Reen et al. |
| 4,315,359 A | | 2/1982 | Gray |
| 4,380,355 A | | 4/1983 | Beardmore |
| 4,410,285 A | | 10/1983 | Strasser et al. |
| 4,428,719 A | | 1/1984 | Hayashibara et al. |
| 4,482,302 A | | 11/1984 | Grignon |
| 4,508,567 A | | 4/1985 | Mizuno et al. |
| 4,575,264 A | | 3/1986 | Mizobuchi et al. |
| 4,605,874 A | * | 8/1986 | Whiteley .................... 310/268 |
| 4,618,806 A | | 10/1986 | Grouse |
| 4,655,681 A | | 4/1987 | Mori et al. |
| 4,664,592 A | | 5/1987 | Grzina |
| 4,699,525 A | | 10/1987 | Mizobuchi et al. |
| 4,719,377 A | | 1/1988 | Horie et al. |
| 4,806,080 A | | 2/1989 | Mizobuchi et al. |
| 4,924,125 A | | 5/1990 | Clark |
| 5,105,115 A | * | 4/1992 | Shinryo et al. ............. 310/258 |
| 5,117,141 A | * | 5/1992 | Hawsey et al. ............. 310/114 |
| 5,135,363 A | | 8/1992 | Harmsen et al. |
| 5,208,503 A | * | 5/1993 | Hisey ......................... 310/259 |
| 5,220,231 A | | 6/1993 | Veronesi et al. |
| 5,269,663 A | | 12/1993 | Cuniberti |
| 5,289,066 A | | 2/1994 | Clark |
| 5,319,844 A | * | 6/1994 | Huang et al. ................. 29/598 |
| 5,332,374 A | | 7/1994 | Kricker et al. |
| 5,356,272 A | | 10/1994 | Nagata et al. |
| 5,370,509 A | | 12/1994 | Golding et al. |
| 5,399,074 A | | 3/1995 | Nose et al. |
| 5,407,331 A | | 4/1995 | Atsumi |
| 5,440,185 A | * | 8/1995 | Allwine, Jr. ........... 310/156.37 |
| 5,443,503 A | | 8/1995 | Yamane |
| 5,594,186 A | * | 1/1997 | Krause et al. ................ 75/228 |
| 5,641,276 A | * | 6/1997 | Heidelberg et al. ...... 417/423.7 |
| 5,656,880 A | | 8/1997 | Clark |
| 6,132,186 A | * | 10/2000 | Cooper et al. ........... 417/423.7 |
| 6,347,929 B1 | * | 2/2002 | Cooper et al. ........... 417/423.7 |

FOREIGN PATENT DOCUMENTS

| | | |
|---|---|---|
| DE | 19622286 | 11/1998 |
| EP | 0401761 | 12/1990 |
| EP | 0719938 | 7/1996 |
| FR | 2267650 | 11/1995 |
| GB | 2307947 | 6/1997 |
| JP | 61010930 | 6/1984 |
| JP | 61150628 | 7/1986 |
| WO | 880219 | 3/1988 |

OTHER PUBLICATIONS

Hoganas AB Advertisement, Oct., 1996.

Krause et al, "A Pressed Soft Magnetic Material for Motor Applications", Jun. 1996, and Forward.

Jansson et al, Powdered Soft Magnet Materials for Medium Frequency Applications, Feb. 1996.

Platt, IEEE Transactions on Magnetics, vol. 25, No. 4, pp. 3076–3078, Jul. 1989.

Tengzelius et al, The International Journal of Powder Metallurgy, vol. 32, No. 3, pp. 203–205, Jul. 1996.

Zhang et al, Including Abstract, "Analysis and Experimental . . . Powder Iron Metallurgy", Manuscript recv'd.Feb. 2, 1997, Conference held Apr. 1–4, 1997, Digest of papers presented at conference (date unknown), Published Sep. 1997.

Magnews, w/ Hogans advertisement, Winter–1995.

Prof. A.G. Jack, The UK Magnetic Society, Feb. 14, 1996

* cited by examiner

DYNAMO ELECTRIC MACHINES AND STATORS FOR USE IN SAME

The present application is a continuation of application Ser. No. 09/533,320, filed Mar. 22, 2000, now U.S. Pat. No. 6,347,929; which is a continuation of application Ser. No. 08/906,847, filed Aug. 6, 1997, now U.S. Pat. No. 6,132,186. The disclosure of each of these applications is incorporated in its entirety herein by reference.

BACKGROUND OF THE INVENTION

The present invention relates to dynamo electric machines and stators for use in same. More particularly, the invention relates to generally flat structured, dynamo electric machines, e.g., brushless electric motors, and to stators for use therein.

Brushless electric motors have been suggested and/or used for various purposes. In general, such motors come in at least two configurations; a drum style motor in which the rotor and stator of the motor have generally cylindrical shapes; and a flat style motor in which the rotor and stator of the motor are present as generally flat discs. Although the drum style motors are often capable of generating more power, the flat style motors have the advantage of being compact in size.

It would be advantageous to provide flat style or disc brushless electric motors which generate increased amounts of power.

Flat style brushless electric motors have been suggested for use with impeller pumps. See, for example, Mizobuchi et al U.S. Pat. No. 4,806,080; Kricker et al U.S. Pat. No. 5,332,374; and Atsumi U.S. Pat. No. 5,407,331. There continues to be a need to provide new impeller pumps driven by powerful flat style brushless electric pumps, in particular for pumping liquids, such as water and the like.

SUMMARY OF THE INVENTION

New dynamo electric machines, stators for use in such machines and pumps including such stators have been discovered. The present invention takes advantage of the discovery that dynamo electric machine stators comprising masses of metal particles, preferably pressed metal particles, provide more efficient, powerful dynamo electric machines, preferably brushless electric motors having longer useful lives and/or producing increased or enhanced amounts of power, relative to similar machines having substantially the same dimensions and including stators made from solid metal members.

Without wishing to limit the invention to any particular theory of operation, it is believed that the present stators which comprise masses of metal particles are effective in disrupting, or otherwise mitigating against the harmful effects of, eddy currents that develop in the stator. Such eddy currents reduce the effectiveness of the dynamo electric machines, for example, the effective power generating ability of the brushless electric motor. In any event, the present dynamo electric machines, including stators comprising masses of metal particles, have been found to be powerful and effective in many applications.

The present stators are useful in any dynamo electric machines, for example, motors, generators, alternators, motor/generator combinations, motor/tachometer combinations, frequency changers and the like. Preferably the dynamo electric machine is of the brushless type, and more preferably of the brushless direct current (DC) type.

The term "motor" is used extensively hereinafter and is meant to encompass or include within its scope any such dynamo electric machine.

One particularly useful application of such stators is in brushless electric motors which power work components, such as pump and compressor impellers, fan blades, mixing and blending implements and the like. A very advantageous configuration provides such stators used in combination with rotors which are integral with the work component. Pumps, such as liquid handling pumps, powered by such brushless electric motors are very beneficial embodiments of the apparatus of the present invention.

The present motors, stators, apparatus and pumps are relatively straightforward in construction and easy to use. These motors, stators, apparatus and pumps provide a high degree of reliability and long effective life and provide one or more advantages which enhance performance and/or cost effectiveness.

In one embodiment, the present invention is directed to motors (dynamo electric machines), preferably brushless electric motors, which comprise a rotor and a stator. The rotor has a rotary axis and includes a plurality of permanent magnetic poles arranged in a generally flat array. The stator, which comprises a mass of metal particles, preferably a mass of pressed metal particles, is spaced apart from and generally facing the generally flat array of permanent magnetic poles. The stator has a plurality of magnetic windings positioned and adapted to effect rotation of the rotor about the rotary axis upon energization thereof.

Reduced eddy currents preferably are obtained during operation of such motors relative to the operation of similar motors in which the stator comprises a solid metal mass or member instead of the mass of pressed metal particles. In addition, when compared to stator bodies made solely of polymeric materials, the present stator bodies provide motors with reduced effective air gaps between the stators and the rotors, which feature ultimately yields more powerful motors relative to similar motors with stator bodies of polymeric materials. The present stators preferably consist essentially of a mass of pressed metal particles. The mass of pressed metal particles advantageously has a density equal to at least about 95% of the theoretical density of a solid metal member. In a very useful embodiment, the stator includes substantially linear acicular metal particles having a substantially triangular configuration.

The present motors preferably are brushless direct current (DC) electric motors, for example, brushless DC, one (1), two (2) or more, such as three (3), phase electric motors.

The present stators preferably comprise plates, for example, substantially flat plates, and a plurality of spaced apart projections or teeth including masses of metal particles, for example, as described herein. The plates of the present stators have a first end surface, a substantially opposing second end surface and a peripheral surface therebetween. The plurality of spaced apart projections extend from the second end surface away from the plate and, together with the second end surface of the plate, define a plurality of slots therebetween.

The plate preferably has a central axis which intersects both the first end surface and the second end surface. Each of the plurality of projections preferably extends inwardly from the peripheral surface and terminates prior to intercepting the central axis.

Each slot of the plurality of slots preferably has a substantially constant dimension between the two adjacent projections which define the slot. In a very useful embodiment, the plate and projections are unitary, that is are made of a single or unitary member.

Apparatus for performing useful work are provided which comprise work components, rotors and stators. The work components, such as pump or compressor impellers, fan blades, mixing and blending implements, others assemblies which perform useful work on a material in contact with the work component and the like, include a rotary axis and are mounted for rotation about the rotary axis. The work component is configured and positioned so that the rotation of the work component is effective to perform work on a material in contact with the work component. The rotor is coupled, preferably directly coupled, to and rotatable with the work component and includes a plurality of permanent magnetic poles arranged in a generally flat array. The stator is as described previously and is adapted to effect rotation of the rotor and the work component upon energization thereof.

As used herein, the term "directly coupled" as it relates to the relationship between the work component and the rotor refers to an apparatus in which the work component and the rotor are directly secured or attached to each other, so that no power transmission assembly, for example, a shaft, gear arrangement or the like, transfers power from the rotor to the work component. This "direct coupling" relationship, which may be considered an integral rotor/working component combination, very effectively provides power to the work component while reducing the size and space requirements of the apparatus.

In a very useful embodiment, the work component and stator are present in a unitary or single member, for example, a member made of a substantially uniform composition.

Pumps are provided which comprise pump casings, impellers, rotors and stators. The pump casing has an inlet and an outlet. The impeller has a rotary axis and rotatably mounted within the pump casing for rotation about the rotary axis. The impeller is configured and positioned relative to the pump casing so that rotation of the impeller is effective to urge fluid from the inlet to flow through the outlet. The rotor is coupled to and rotatable with the impeller and includes a plurality of permanent magnetic poles arranged in a generally flat array. The stator is as described previously and is adapted to effect rotation of the rotor and the impeller upon energization thereof.

The present work apparatus and pumps preferably provide increased or enhanced power, and more preferably reduced detrimental eddy current effects, during operation relative to similar apparatus and pumps in which a solid metal mass or member is used in place of the mass of metal particles in the stator.

Each of the features disclosed herein is included within the scope of the present invention. In addition, all combinations of the presently disclosed features which are not mutually inconsistent or incompatible are also included within the scope of the present invention.

These and other aspects and advantages of the present invention are apparent in the following detailed description and claims, particularly when considered in conjunction with the accompanying drawings in which like parts bear like reference numerals.

DETAILED DESCRIPTION OF THE PREFERRED EMBODIMENT

Figure 1:
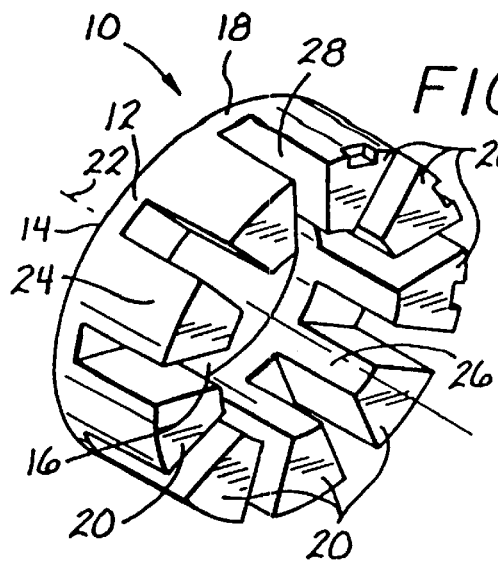
FIG. 1 is a perspective drawing of a stator in accordance with the present invention.
Figure 2:
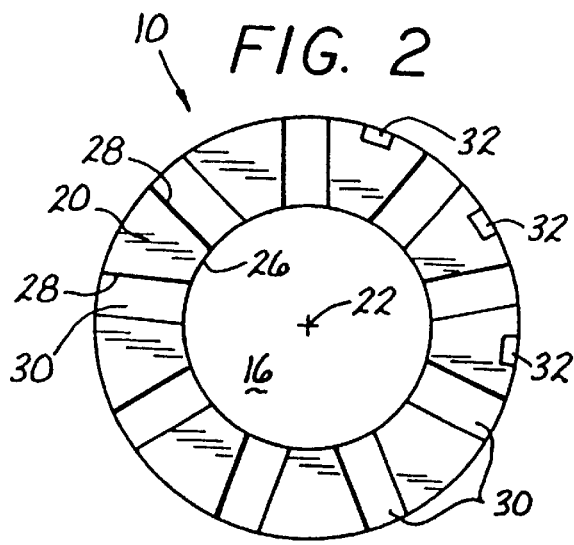
FIG. 2 is a front plan view of the stator shown in FIG. 1.

Referring now to the drawings, a stator, shown generally at 10, in accordance with the present invention includes a substantially flat plate 12 having a back surface 14, a substantially opposing front surface 16 and a peripheral surface 18 therebetween. Extending from the substantially flat front surface 16 and peripheral surface 18 are a series of nine (9) projections which extend away from the front surface and radially inwardly from the peripheral surface and terminate prior to the central axis 22 of the stator 10.

Each of the projections 20 includes a outer peripheral surface 24, an inner peripheral surface 26 and two (2) equally sized side surfaces 28. The side surfaces 28 between adjacent projections 20, together with front surface 16, form a slot 30. Each of the slots 30 is equally sized and has a substantially constant dimension radially inwardly from the peripheral surface 12 and outer peripheral surface 24. A series of three (3) notches 32 are located on three (3) adjacent projections 20 of stator 10. Each of these notches 32 is adapted to receive and hold a Hall sensor. These Hall sensors are useful in controlling the operation of the motor including stator 10.

Figure 13A:
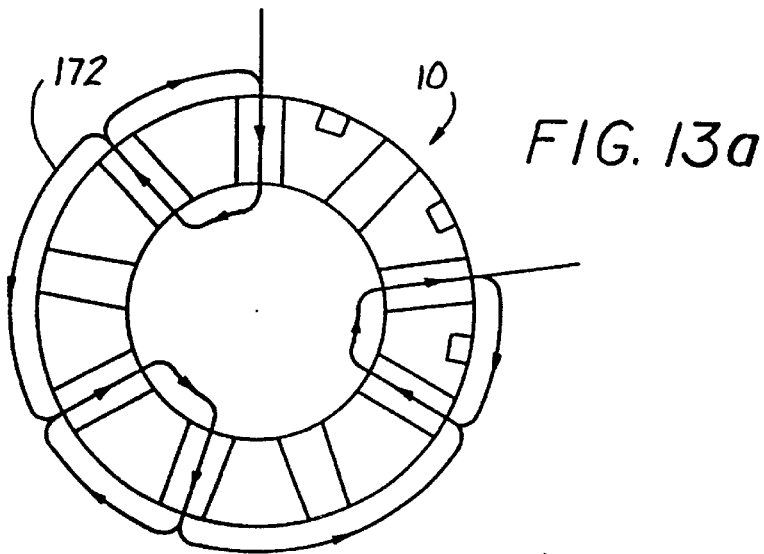
FIGS. 13A, 13B and 13C are front plan views of the stator of the pump shown in FIG. 7 illustrating a windings pattern for a six (6) pole, three (3) phase motor.
Figure 13B:
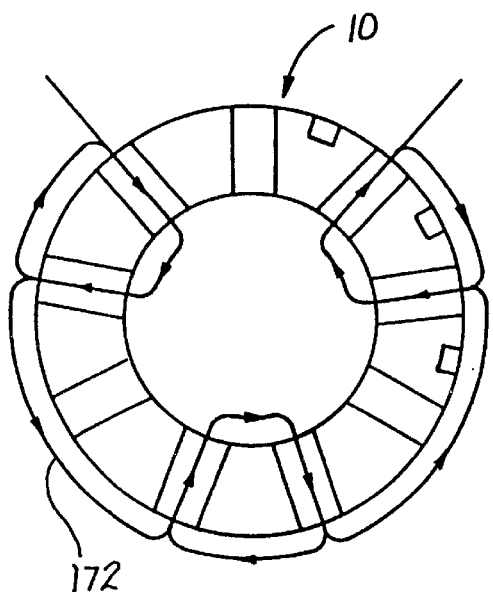
Figure 13C:
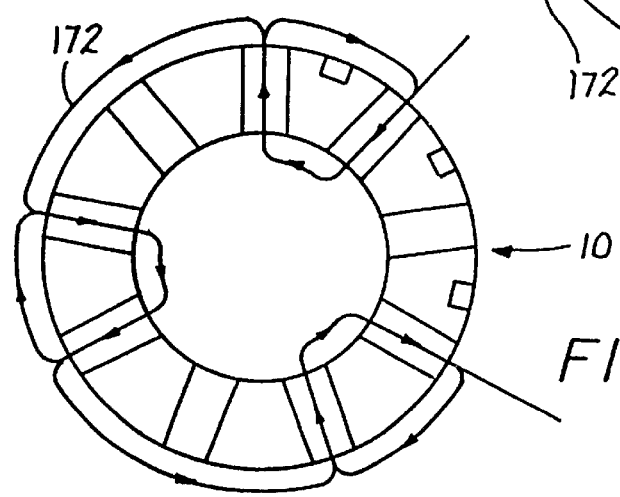

Stator 10 is particularly effective for use in a three (3) phase direct current (DC) brushless electric motor. However, stators similar in composition to stator 10 can be employed in one (1), two (2) or more phase DC brushless electric motors. Electric windings are provided in the slots 30. One pattern for such windings is illustrated in FIGS. 13a, 13b and 13c. For the sake of clarity, only one winding is shown in each of FIGS. 13a, 13b and 13c (and also in FIGS. 14a, 14b and 14c). However, a relatively large number of windings preferably are included in each of the slots 30, and the number of windings is chosen based on the desired power output of the motor.

An important feature of the present stator 10 is that it is made from a mass of metal particles. Specifically, stator 10 is made from a mass of pressed metal particles. Such particles of metal, for example, metals having magnetic properties, i.e., metals which are attracted to magnets, such as iron, nickel, cobalt, other magnetic metals and the like, alloys, such as steel, iron and/or other metal or metals having magnetic properties alloyed with molybdenum, manganese, chromium, carbon, sulfur, silicone, copper, nickel, vanadium, niobium, gold, aluminum, phosphorus and the like and mixtures thereof, preferably are substantially linear, acicular particles having a substantially triangular configuration. Such a particle, shown generally at 34, is illustrated in FIG. 5.

Stator 10 may be, and preferably is, prepared in accordance with Krause et al U.S. Pat. No. 5,594,186, the disclosure of which is incorporated in its entirety herein by reference.

Figure 5:
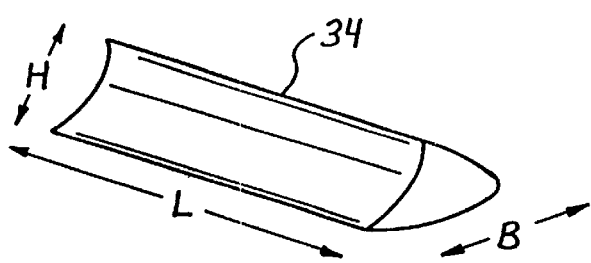
FIG. 5 is a perspective view of a metal particle used in forming the stators shown in FIGS. 1 to 4.
Figure 6:
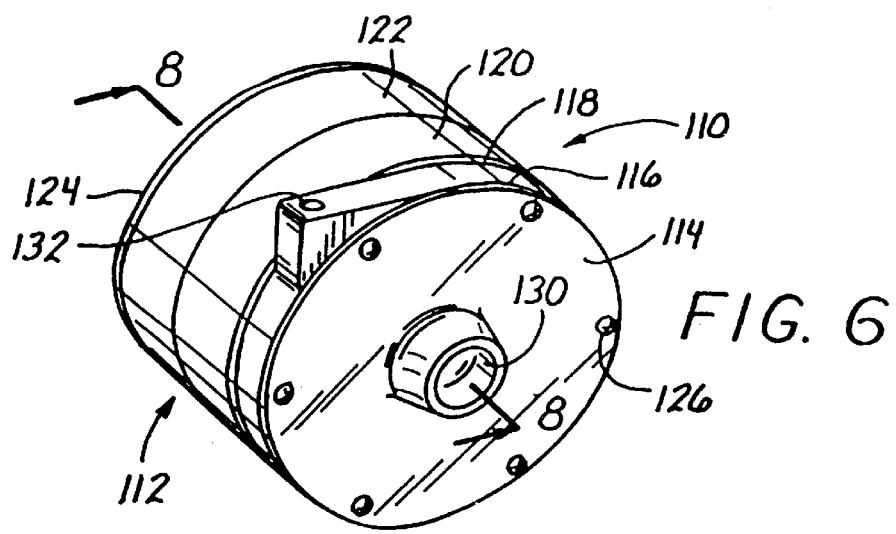
FIG. 6 is a perspective drawing of a fully assembled pump in accordance with the present invention.

The metal particles 34 preferably have dimensions of about 0.002 to about 0.05 inches in height (H dimension in FIG. 5), about 0.002 to about 0.05 inches along the base (B dimension in FIG. 5) and about 0.006 to about 0.20 inches in length (L dimension in FIG. 5). The metal particles preferably have a substantially triangular cross-section and a die fill ratio of less than 3 to 1, with sufficient particle flow characteristics to permit the economic manufacture of the stator having a density of at least about 95%, and more preferably at least about 96%, of the theoretical density of a solid metal member.

It should be noted that the metal particles which may be used to produce the present stators can be of any suitable size, shape and configuration. Such particles preferably are of such configuration that a flat style motor, as described herein, including a stator made from a mass of such particles provides for increased power production and/or reduced detrimental eddy current effects relative to a similar motor in which the stator is made from a mass of solid metal rather than the mass of such particles. Also, the metal particles having a substantially triangular cross-section useful in the present invention are not limited to the embodiment shown in FIG. 5. Such metal particles can have longitudinal surfaces that are independently convex, concave and/or planar.

In addition, the present stators can be made in the form of a composite in which the mass of metal particles is combined, e.g., layered, mixed or otherwise composited, with one or more other materials, for example, polymeric materials, wood and the like and mixtures thereof. Such a composite stator should include a sufficient amount of the metal particles to function effectively as a stator and to provide at least one of the benefits or advantages described herein. Such composite stators can be produced using conventional composite production techniques, for example, mixing, layering, compressing, shaping, injection molding, etc.

The stator 10 of the present invention may be prepared by the traditional metal powder process comprising the steps of: (1) forming a metal particle mixture comprising the metal particles and a lubricant; (2) cold uniaxial pressing of the mixture to form a green compact having a high green density and good green strength; (3) heating the green compact at a sufficient temperature to pyrolyze the lubricant and form the metal stator; (4) optionally sintering the stator at a sufficient temperature for a sufficient time to impart additional strength to the stator and form a sintered stator; and (5) cooling the stator or sintered stator, then performing optional secondary operations on the stator to provide a finished metal component. Preferably, the method comprises a single cold, uniaxial pressing step, a single heating step, and a single sintering step, and provides a green compact and a stator having a density at least 95%, and preferably at least 96%, of the theoretical density, and a finished stator of essentially the identical size and shape of the green compact.

The lubricant used is typically an organic compound having a density of about 0.8 to about 1 g/cc (gram per cubic centimeter). In contrast, the powdered metal typically has a density of about 6 to about 8 g/cc. Accordingly, on a volume basis, even a small amount of lubricant by weight occupies an appreciable portion of the die volume. To achieve a high density, the volume occupied by lubricant preferably is minimized. Therefore, the lubricant preferably is present in an amount of about 0.015% to about 0.4% and more preferably about 0.015% to about 0.25%, by weight of the metal particle mixture.

The lubricant is an organic compound capable of being decomposed, or pyrolyzed, at the heating temperature. The pyrolysis products are gases which are expelled during heating. The lubricant may be a solid at room temperature and incorporated into the metal particle mixture in particulate form. Examples of lubricants include, but are not limited to, ethylene bis-stearamide, $C_{12}$ to $C_{20}$ fatty acids, for example, stearic acid and the like, paraffins, synthetic and/or natural waxes, polyethylene, fatty diesters, fatty diamides and the like and mixtures thereof. Salts of organic acids, like zinc, lithium, nickel, iron, copper, and/or magnesium stearate, also can be used as the lubricant. However, acid salt lubricants can leave a metal oxide by-product in the finished stator. The metal oxide by-product can adversely effect the stator.

For additional details regarding the production of stator 10 see the above-noted Krause et al patent.

Figure 3:
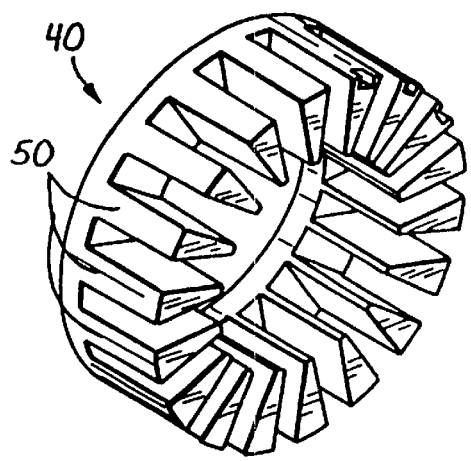
FIG. 3 is a perspective drawing of an alternate embodiment of a stator in accordance with the present invention.
Figure 4:
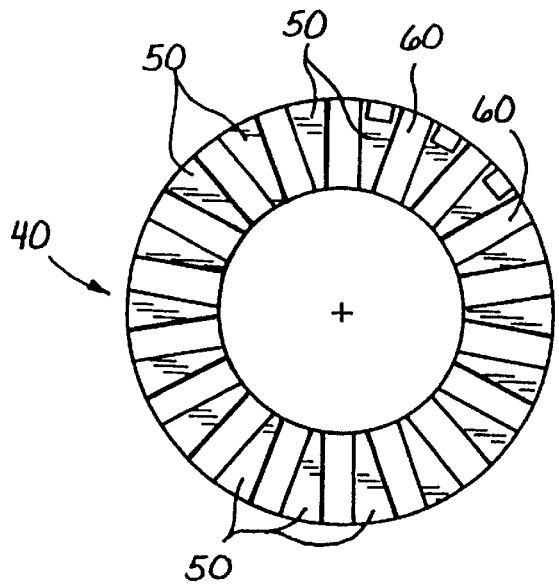
FIG. 4 is a front plan view of the stator shown in FIG. 3.

FIGS. 3 and 4 show a substantially similar stator, shown generally at 40, which is substantially similar to stator 10. Components of stator 40 which correspond to components of stator 10 are identified by the same reference numeral increased by 30.

The primary difference between stator 40 and stator 10 is in the number and size of projections 50 relative to projections 20. Specifically, stator 40 has eighteen (18) projections 50 as opposed to nine (9) projections 20. Each of the projections 50 is substantially smaller in size than the projections 20.

Figure 14A:
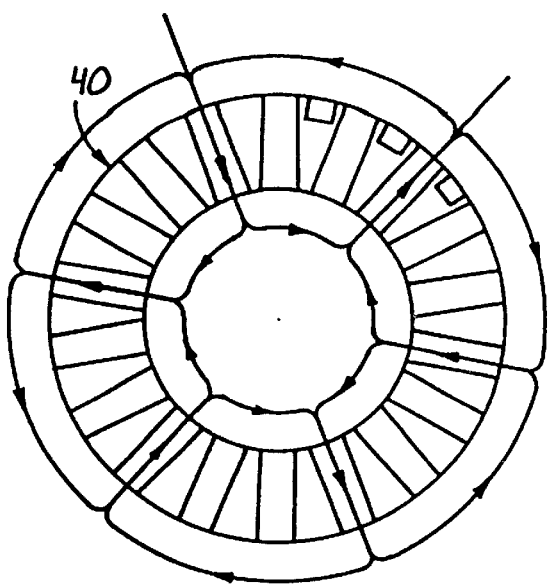
FIGS. 14A, 14B and 14C are front plan views of the stator shown in FIGS. 3 and 4 illustrating a windings pattern for a six (6) pole, three (3) phase motor.
Figure 14B:
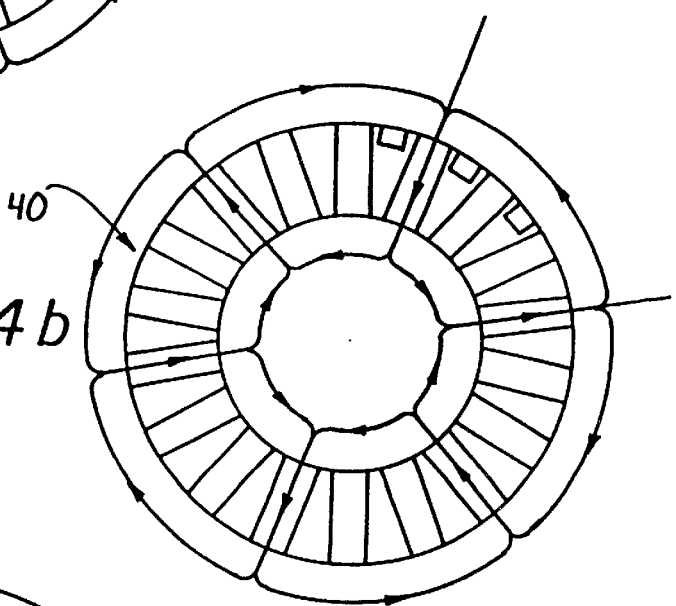
Figure 14C:
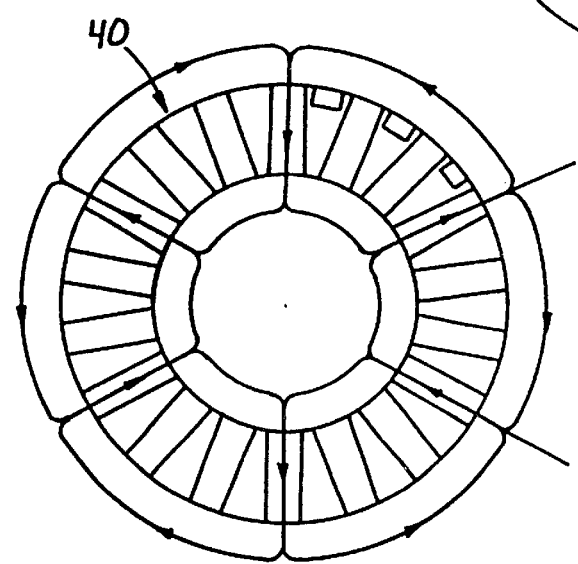

Stator 40 can be employed in a three (3) phase electric motor in which electric windings are provided within the slots 60 of the stator, using a winding pattern as shown in FIGS. 14*a*, 14*b* and 14*c*. Of course, a stator structured similarly to stator 40 can be used in a one (1), two (2) or more phase DC brushless electric motor.

In the following description, the stator 10 is used. However, it should be noted that stator 40 can be similarly used.

A motor/work component in accordance with the present invention is illustrated as follows. A motor/pump combination, shown generally at 110, includes a housing 112 which is made up of a pump cover 114, a pump case 116, a bulkhead housing element 118, a stator housing 120, a control housing 122 and a control cover 124. These housing components of combination 110 are fastened together using a plurality of conventional screw-type fasteners 126 which pass through each of the housing components from pump cover 114 to control cover 124. Conventional fastener nuts 127 are coupled to the fasteners 126 to maintain the fasteners in place.

Figure 8:
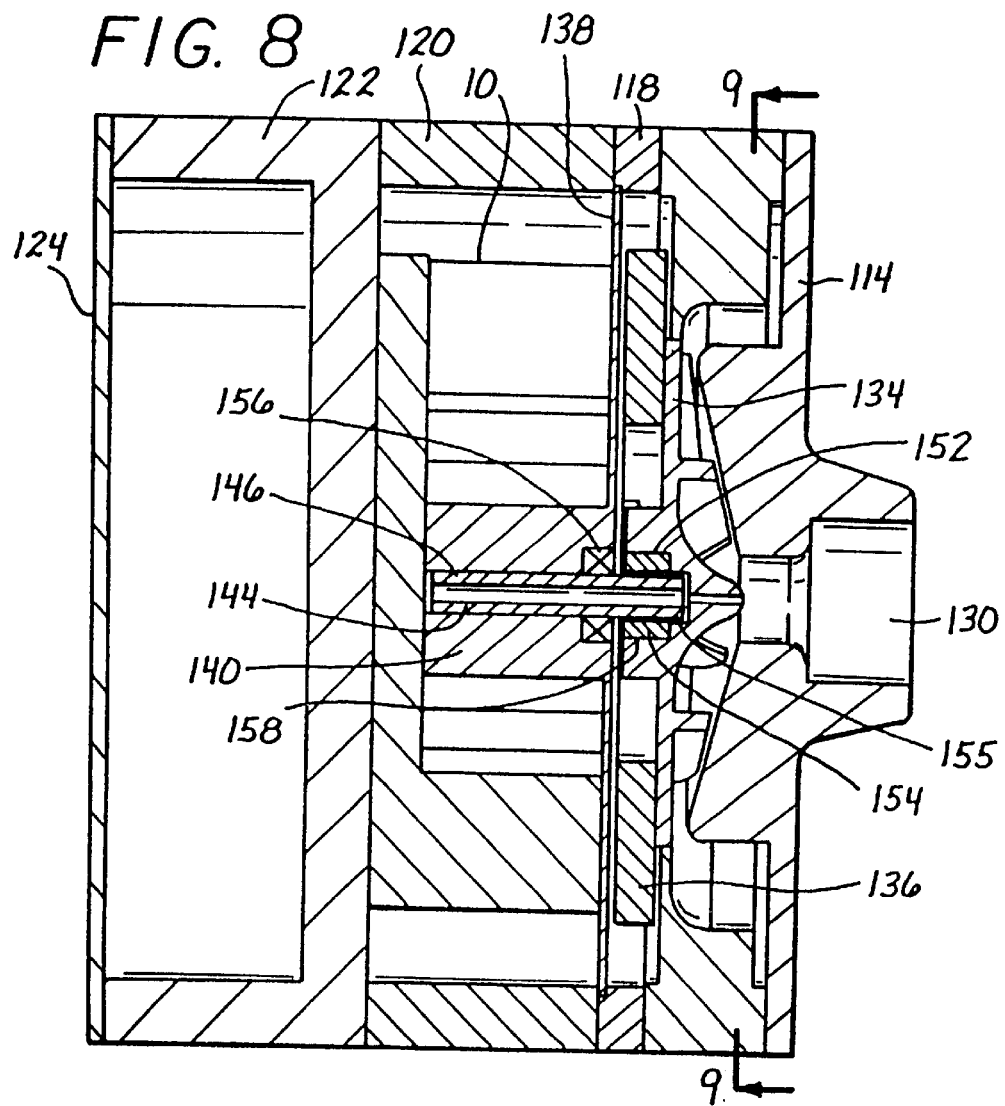
FIG. 8 is a cross-sectional view taken generally along line 8—8 of FIG. 6.

Pump cover 114 includes a liquid inlet 130, while pump case 116 includes a liquid outlet 132. An impeller 134, a rotor 136 and stator 10 (including magnetic windings which are not shown) are positioned in the assembled combination 110, as shown in FIG. 8. The bulkhead housing element 118 carries a bulkhead sheet 138 which includes a centrally located boss 140. The combination of bulkhead housing element 118 and bulkhead sheet 138 is an integrally formed structure and forms a static seal which prevents the stator 10 from being exposed to the liquid being pumped. Stator 10 is disposed in stator housing 120. Control housing 122 houses the controls for the operation or activation of the stator 10.

As shown in FIG. 8, centrally located boss 140 is configured to support stationary axle 144, which is of tubular (hollow or solid) construction, at end 146. The boss 140 and/or end 146 of axle 144 are keyed or include engaging flat surfaces which facilitate maintaining the axle stationary relative to the boss. Axle 144 extends beyond the bulkhead sheet 138 into impeller 134 through the central opening 148 of annular rotor 136.

Impeller 134 includes an opening 152 which extends away from the inlet 130 and is configured to allow both axle 144 and rotating bearing 154 to be received therein. End 155 of axle 144 in opening 152 is free, that is it is not secured to impeller 134. In addition, a thrust bearing 156 is positioned in the boss 140 and is maintained stationary. This thrust bearing 156 faces the back surface 158 (FIG. 8) of bearing 154 which rotates with impeller 134 and rotor 136 around axle 144. Thrust bearing 156 can be relatively small because the net thrust force is reduced since the axial force from the rotor 136 opposes the force induced by pressure rise.

Figure 10:
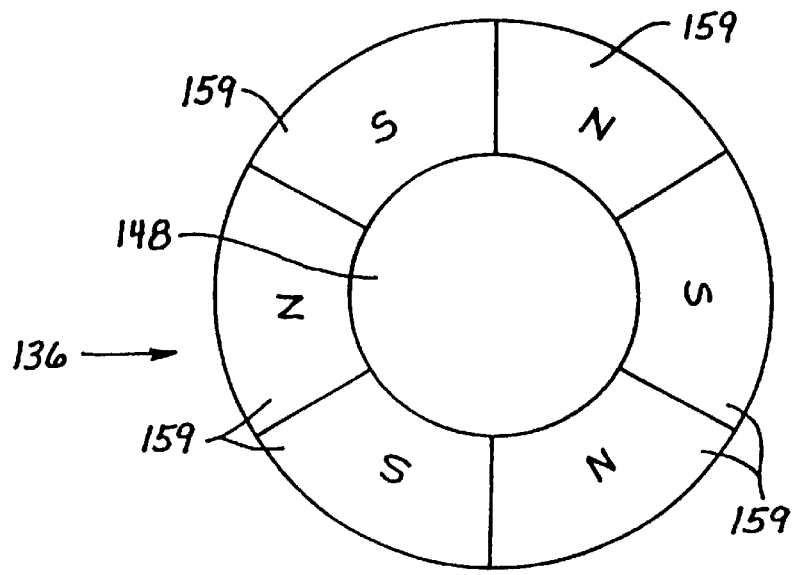
FIG. 10 is a front plan view of the rotor of the pump shown in FIG. 7.

Annular rotor 136 includes a series of six (6) alternating permanent magnetic poles 159, as shown in FIG. 10. Permanent magnetic poles 159, which are alternating north (N) and south (S) magnetic poles, are arranged in a circular array and are positioned to face the stator 10. In addition, rotor 136 includes an annular region 161 extending away from stator 10 which has the magnetic properties of iron. Annular region 161 is coextensive with the areas of permanent magnetic poles 159 perpendicular to the rotary axis 170 of motor/pump combination 110. Region 161 with the magnetic properties of a soft magnetic material, such as iron, enhances the interaction between the stator 10 and rotor 136, thereby enhancing the ability of the rotor 136 to be rotated in response to the magnetic windings located on stator 10 and enhances power generation.

The rotor 136 can be made of individual magnetic segments to provide the permanent magnetic poles and a region or layer (corresponding to region 161) of iron located on the back side (away from stator 10) of the rotor to provide the magnetic properties of a soft magnetic material. One alternative is to use a ring magnet, in place of the individual magnet segments, to provide the plurality of permanent magnetic poles, together with a back layer or region of iron and the like having magnetic properties of a soft magnetic material. However, rotor 136 preferably is an integral structure, for example, made of a composite of a thermoplastic polymeric matrix material, such as polypropylene and the like, and strontium ferrite and the like particles, which can be magnetized to provide both the alternating permanent magnetic poles 159 as well as an annular region 161 extending away from the stator 10 which has the magnetic properties of a soft magnetic material.

In producing such a composite rotor, the percentage of each constituent is adjusted in order to obtain the desired balance of magnetic and structural properties. The composite rotor may be formed by an injection molding process in which the mixed constituents is heated to be flowable and then forced into a closed cavity mold. While the mixed material is still in the mold, magnetizing apparatus, appropriately positioned relative to the mold, is energized, thereby aligning the magnetic particles within the mixed material. In a preferred embodiment, rather than having flux lines that are perpendicular to the pole face as they pass through the rotor 136, the internal flux at the back region (corresponding to region 161) of the rotor is directed to turn parallel to the pole face surface and towards the adjacent opposite polarity poles. Essentially, this creates a flux return path within the rotor 136 and eliminates the need for a separate magnetic part (back iron).

Figure 7:
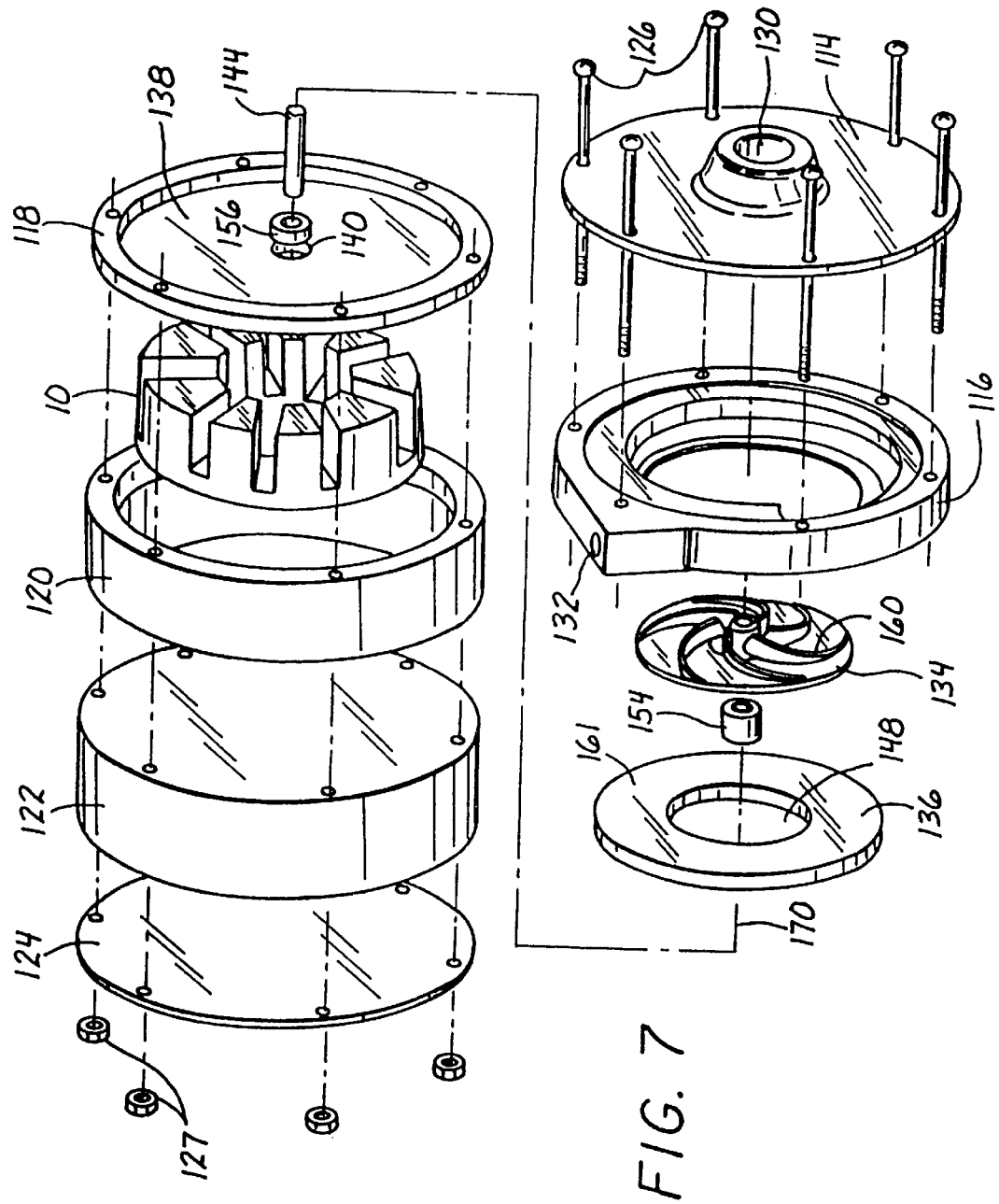
FIG. 7 is a perspective view of the pump shown in FIG. 6 with the parts exploded for illustrative clarity.
Figure 9:
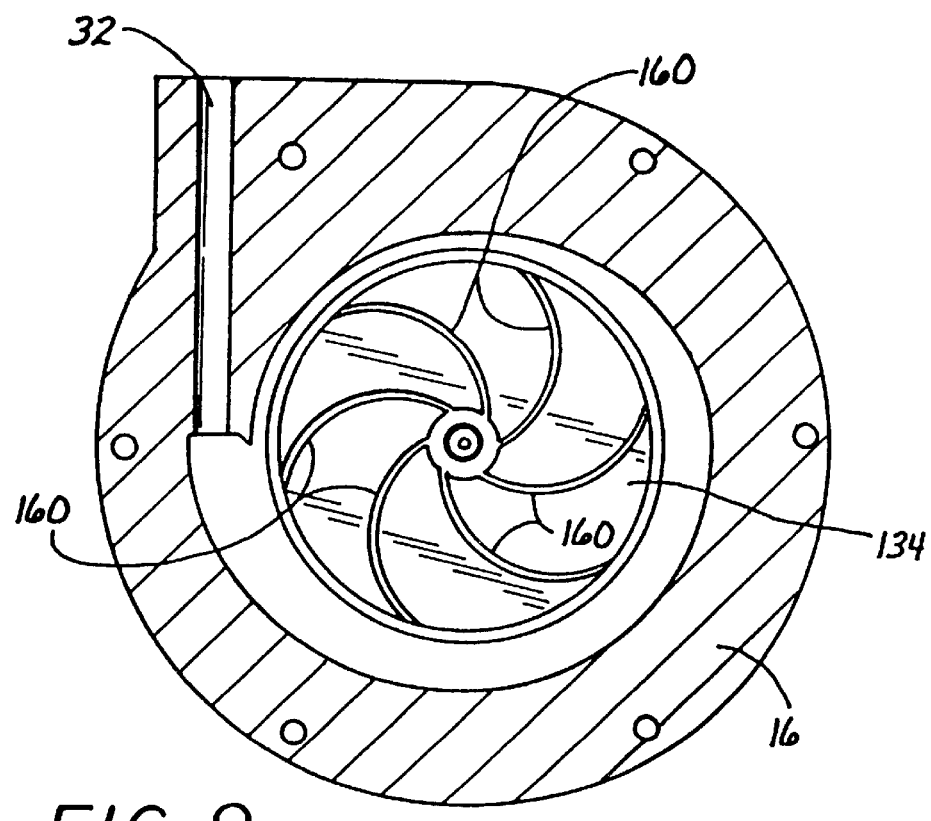
FIG. 9 is a cross-sectional view taken generally along line 9—9 of FIG. 8.

The integrally structured rotor 136 described herein is an example of a ring magnet with the additional feature that a region 161 (FIG. 7) of the structure is magnetized to have magnetic properties of a soft magnetic material. Having such an integral structure provides substantial benefits. For example, reduced weight is achieved which reduces pump wear and vibration. Also, the use of an integral rotor 136 reduces the number of parts included in the combination 110.

Impeller 134 includes a series of curved vanes 160 which are present in the primary liquid flow path between inlet 130 and outlet 132. Upon rotation of impeller 134, vanes 160 are effective to impart centrifugal energy to the liquid passing through inlet 130 which urges the liquid to flow under increased pressure through outlet 132. Thus, impeller 34 and vanes 60 provide the primary pumping action in motor/pump combination 110.

The impeller 134 is directly coupled to, that is integral with, the rotor 136. Thus, impeller 134 rotates in direct response to the rotation of rotor 136 with no coupling or power transfer assembly, such as a shaft, gear arrangement and the like, between these two components. This direct coupling feature reduces the size of combination 110 and the number of components required. In a very useful embodiment, impeller 134 and rotor 136 are present as a single or unitary member. For example, a single part structured or configured to include both impeller 134 and rotor 136, for example, made from the composite material described previously with regard to rotor 136, can be formed using conventional techniques and performs very effectively in accordance with the present invention. Such a unitary impeller 134/rotor 136 is shown in the drawings simply by considering the impeller and rotor as a single part. The advantages provided by such a unitary impeller (work component) 134/rotor 136 include size reduction, reduced member of components and ease of assembly.

The maximum magnetic cross-sectional area of rotor 136 perpendicular to rotary axis 170 of the pump 110 is larger than the maximum cross-sectional area of impeller 134 perpendicular to the axis. The use of a relatively large rotor 136 allows much shorter housing profiles, for example, relative to drum style brushless electric motor/pump combinations. In addition, the relatively large rotor 136 provides a larger area adjacent the bulkhead sheet 138 for dissipation of heat, for example, into the liquid from inlet 130 (as is described hereinafter), thereby reducing or even eliminating the need for bypass cooling passages. Further, the large rotor 136 provides the extra area needed for the diffusion sections of the combination 110 so that there is less wasted space. Moreover, the large rotor 136 relative to the impeller 134 provides increased power to the impeller while, at the same time, reducing the weight of the impeller relative to the rotor. Since relatively less weight is being rotated, the combination 110 performs more efficiently. In other words, more of the power that is generated by the interaction between the stator 10 and the rotor 136 is passed to the liquid being pumped through outlet 132.

The stator 10 includes a plurality of magnetic windings 172 (see FIGS. 13A, 13B and 13C) positioned to interact with the permanent magnetic poles 159 of the rotor 136 to effect rotation of the rotor and the impeller 134 upon energization of the windings. The combination of rotor 136, stator 10 (with windings 172) and controls in control housing 122 forms a six (6) pole, three (3) phase brushless DC electric motor assembly. In this embodiment, the windings 172 on stator 10 can be provided as illustrated in FIGS. 13A, 13B and 13C. Of course, the present invention is not limited to any specific number of permanent magnetic poles or to a motor of any particular phase or phases. The disc or flat arrangement of the present motors and motor/pump combination allows substantial flexibility in terms of size, number of permanent magnetic poles and motor configurations.

The controls included within control housing 122 act to control the operation of the stator 10 so as to provide the desired rotation of the rotor 136 and impeller 134. These controls can be based on electronics which are conventional and well known in the art. In particular, controls which are useful in operating brushless DC electric motors may be employed. Since such controls are conventional and well known in the art, a detailed description thereof is not needed to practice the present invention and is, therefore, not presented here.

An increase in efficiency is achieved by reducing the running friction of the motor/pump combination 110. This is accomplished, at least in part, by using a portion of the liquid from inlet 130 to establish a fluid film between the rotating rotor 136 and impeller 134 and the stationary frame, that is the bulkhead sheet 138, stator 10 and associated components. This fluid film is provided as follows.

Figures 11, 12:
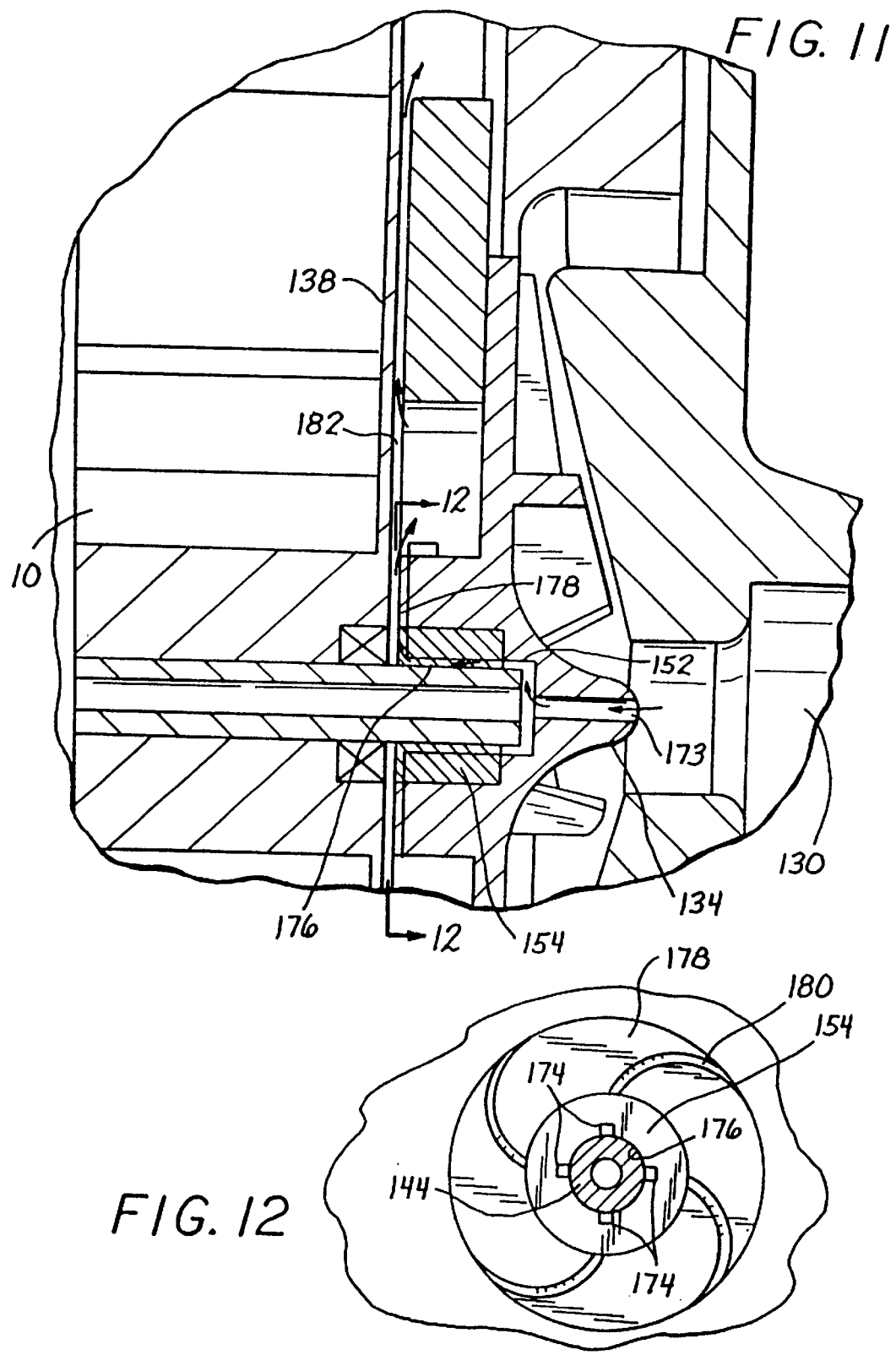
FIG. 11 is an enlarged partial cross-sectional view of the central area of the pump shown in FIG. 6 emphasizing the space between the stator and rotor.
FIG. 12 is a cross-sectional view taken generally along line 12—12 of FIG. 11.

With particular reference to FIGS. 11 and 12, a portion of the liquid from inlet 130 passes into a fluid passageway 173 in impeller 134. Bearing 154 includes a series of four (4) fluid pathways 174 which extend along the outer surface 176 of the axle 144 along the entire length of the bearing 154. These fluid pathways 174 empty into the space between the bulkhead sheet 138 and the back surface 178 of impeller 134. Further, back surface 178, as shown in FIG. 12, includes a series of radially extending vanes 180 which are rotatable with the impeller 134 and positioned to urge liquid from the fluid pathways 174 to flow into the space 182 between the bulkhead sheet 138 and the impeller 134 and rotor 136. This liquid forms a film which reduces friction between the rotating and non-rotating components of motor/pump combination 110 and conducts heat caused by the rotation away from the site of the rotation, thereby facilitating more efficient operation of the combination. The liquid is in fluid communication with the outlet 132 so that a continuous flow of liquid is provided in the fluid pathways 174 and in the space 182 between the impeller 134 and rotor 136 and the bulkhead sheet 138.

Bulkhead housing element 118 and bulkhead sheet 138 provide a seal between the rotating portion, e.g., rotor 136 and impeller 134, of combination 110 and the non-rotating or stationary portion, e.g., stator 10, of the pump. Thus, no rotating member passes through the seal plate defined by bulkhead housing element 118 and bulkhead sheet 138. There are no moving parts within the stationary or electromagnetic portion, e.g. stator 10, of the combination 110. All the moving parts have been integrated into the rotating portion of combination 110. This integrated rotor design feature reduces wear and tear on pump 110 and avoids exposing the stator 10 to the liquid being pumped.

Bulkhead sheet 138 which is positioned, has a configuration and/or is made of material so as to provide one or more enhancements to motor/pump combination 110. Thus, bulkhead sheet 138 is positioned between the rotor 136 and the stator 10 and includes one or more regions, particularly regions which directly face the rotor, which are in contact with and structurally supported by the stator. Allowing the stator 10 to structurally support at least a portion of the bulkhead sheet 138 reduces the size of combination 110, and allows the use of a relatively thin film or layer of material as the bulkhead sheet. For example, the region or regions of the bulkhead sheet 138 which are structurally supported by the stator 10 are preferably less than about 30 mils thick. Having the bulkhead sheet 138 very thin allows for increased interaction between the windings 172 on the stator 10 and the permanent magnetic poles 159 on the rotor 136. This provides for increased efficiency in the interaction between the stator 10 and rotor 136 and increased power generation.

Moreover, the bulkhead sheet 138, particularly the regions of the bulkhead sheet which directly face the rotor 136, are preferably made of a material having a low magnetic permeability, to further reduce the detrimental effects of eddy currents. The reduced magnetic permeability of bulkhead sheet 138 allows for increased interaction between the windings 172 on the stator 10 and the magnetic poles 159 on the rotor 136. The high coefficient of thermal conductivity allows for advantageously increased dissipation of heat and, ultimately, increased life of motor/pump combination 110.

Because at least a portion of the bulkhead sheet 138 is structurally supported by the stator 10, a wide range of materials, satisfying both the reduced magnetic permeability and increased coefficient of thermal conductivity requirements, noted above, can be used in producing the bulkhead sheet. In other words, since the bulkhead sheet 138 is at least partially structurally supported by the stator 10, the strength of the material from which the bulkhead sheet is made is not a primary concern. Examples of useful materials for the bulkhead sheet 138 are brass, austenitic stainless steel, polymeric materials and the like.

Motor/pump combination 110 is constructed so that a very effective static seal is provided by bulkhead sheet 138 so that no liquid from inlet 130 comes in contact with the stationary portion, e.g., stator 10, of the pump. The fact that a static seal, rather than a rotating or otherwise moving seal, is used reduces wear and tear and increases the effective useful life of pump 110.

Components of housing 112 and impeller 134 can be produced using polymeric materials.

Figure 15:
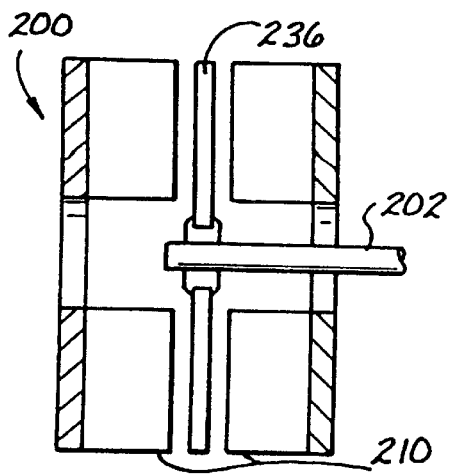
FIG. 15 is a schematic illustration, side section, of an alternate embodiment of a motor in accordance with the present invention.
Figure 16:
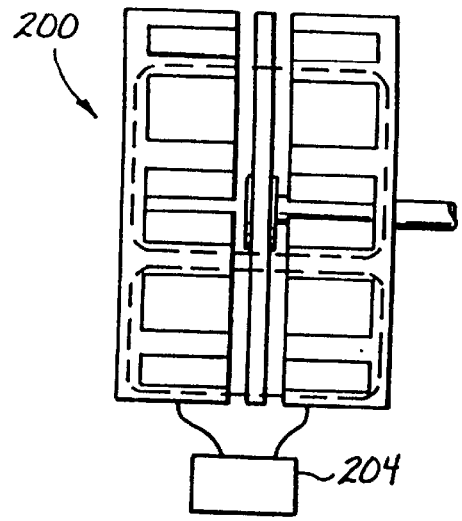
FIG. 16 is another schematic illustration, top view, of the embodiment shown in FIG. 15.

In another embodiment, shown schematically in FIGS. 15 and 16, a brushless DC electric motor, shown generally at 200, includes two (2) stators 210 and a rotor 236 therebetween. The rotor 236 is secured to motor shaft 202. The flux goes between stators 210 as shown in FIG. 16. Motor 200 may be considered to be a stacked motor in that a plurality of stators 210 are used in rotating rotor 236 and motor shaft 202. Increased power is provided by such a stacking arrangement. Such a combination of a single rotor and two (2) stators can be used as the basic building block of a larger, more highly stacked motor.

Figure 17:
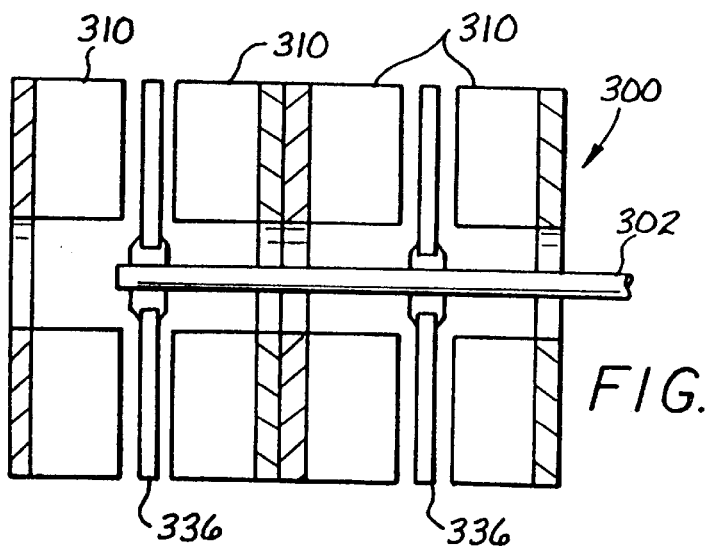
FIG. 17 is a schematic illustration, side section, of an further embodiment of a motor in accordance with the present invention.
Figure 18:
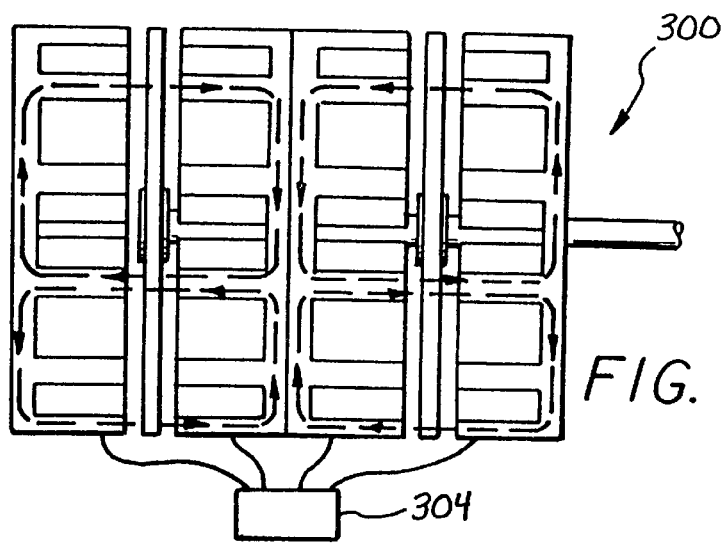
FIG. 18 is another schematic illustration, top view, of the embodiment shown in FIG. 17.

FIGS. 17 and 18 illustrate one such more highly stacked motor 300, which is made up of two (2) pair of stators 310. Two (2) rotors 336, each of which is located between the stators 310 of a different pair of stators, are provided. Both of the rotors 336 are attached to shaft 302.

Each of the stators 210 and 310 has substantially the same configuration as stator 10, previously described. Also, each of the rotors 236 and 336 has substantially the same configuration as the rotor 136, previously described, except that rotors 231 include no region (corresponding to region 161) with the magnetic properties of a soft magnetic material.

Each pair of stators 310 of motor 300 is independent of the other stator pair. The flux can either go through the back to back stators 310 of motor 300 or can be directed within each pair of stators 310, as shown in FIG. 18.

The stacked motors 200 and 300 can be used in any application in which the rotation of motor shaft 202 and 302, respectively, is to be translated into useful work. Stacked motors 200 and 300 can be controlled using conventional control electronics, shown schematically at 204 and 304, respectively. Control electronics 204 and 304 communicate with each of the stators 210 and 310, respectively, to energize the windings located on each of these stators. Energizing the windings on stators 210 and 310 causes the rotors 236 and 336, respectively, and motor shafts 202 and 302, respectively, to rotate. The other end of each of the motor shafts 202 and 302 may be secured to an implement, such as a pump, compressor, fan and the like, which is operated by the power transmitted by the shaft.

The present stators, and dynamo electric machines and pumps including such stators, provide substantial benefits whether a single stator and rotor are employed or a plurality of stators and/or rotors are employed. These stators, which include a mass of pressed metal particles, preferably provide for enhanced power generation, for example, relative to a similar dynamo electric machine employing a stator including a solid metal mass or member in place of a mass of pressed metal particles. Such enhanced power generation can result in reduced machine size and/or increased overall power generation so that the dynamo electric machines including such stators advantageously can be used in a broader range of applications including heavy duty or power intensive applications. The present stators represent a substantial improvement relative to conventional stators, particularly because of the enhanced power generating capabilities of dynamo electric machines including such stators as well as the relatively straightforward and cost effective way in which such stators can be produced.

While this invention has been described with respect to various specific examples and embodiments, it is to be is understood that the invention is not limited thereto and that it can be variously practiced within the scope of the following claims.

What is claimed is:

1. A stator comprising:
   a plate configured to be substantially flat and having a first end surface, a substantially opposing second end surface and a peripheral surface therebetween;
   a plurality of spaced apart projections starting at the peripheral surface and extending from said second end surface away from said plate and defining a plurality of slots therebetween, said slots having a width defined as a distance between two successive projections, and a length orthogonal to the slot width; and
   a plurality of magnetic windings positioned around said projections and substantially orthogonal to the slot length,
   said plate and said projections comprising a mass of metal particles, said stator being included in a brushless direct current electric motor comprising a rotor including a single sided generally flat array of a plurality of permanent magnetic poles.

2. The stator of claim 1 wherein said plate and said projections comprising a mass of metal particles has a density equal to at least about 95% of the theoretical density of a solid metal mass.

3. The stator of claim 1 wherein said plate has a central axis which intersects both said first end surface and said second end surface, and said plurality of projections each extend inwardly from said peripheral surface and terminate prior to intersecting said central axis.

4. The stator of claim 3 wherein the width of each slot is substantially constant between the two projections which define the slot.

5. The stator of claim 1 wherein substantially all of the plurality of windings are positioned around the projections substantially parallel to the first end surface of the plate.

6. A dynamo electric machine comprising:
   a rotor having a rotary axis, and including a single sided generally flat array of a plurality of permanent magnetic poles; and
   a stator spaced apart from and generally facing said single sided generally flat array, said stator including a first end surface, a second end surface, a peripheral surface therebetween, a length extending from said first end surface to said second end surface, and a plurality of spaced apart projections starting at the peripheral surface and extending from said second end surface away from said first end surface toward said rotor and defining a plurality of slots therebetween, said slots having a length parallel to the length between the first and second end surface, and said stator having a plurality of magnetic windings positioned around said projections and substantially nonparallel to the length of said slots, said magnetic windings being adapted to effect rotation of said rotor about said rotary axis upon energization thereof, said stator comprising a mass of metal particles, the dynamo electric machine being a brushless direct current motor.

7. The dynamo electric machine of claim 6 wherein the machine is a brushless direct current electric motor configured to produce reduced eddy current effects during operation of said motor relative to the operation of a substantially identical dynamo electric machine in which a solid metal mass is used in place of the mass of metal particles.

8. The dynamo electric machine of claim 6 which further comprises a work component coupled to and rotatable with said rotor.

9. The dynamo electric machine of claim 6 wherein each of said slots having a substantially constant dimension between the two projections which define the slot.

10. An apparatus for performing useful work comprising:
    a work component having a rotary axis and being mounted for rotation about said rotary axis, said work component being configured and positioned so that the rotation of said work component is effective to perform work on a material in contact with said work component;

a rotor coupled to and rotatable with said work component, and including a single sided generally flat array of a plurality of permanent magnetic poles; and a stator spaced apart from and generally facing said single sided generally flat array, said stator including a plurality of spaced apart projections starting at a peripheral surface of the stator and defining a plurality of slots therebetween, each of said slots having a length orthogonally oriented relative to a distance between two projections defining the slot, and said stator having a plurality of magnetic windings positioned around said projections and substantially nonparallel to the length of said slots, said magnetic windings being adapted to effect rotation of said rotor and said work component upon energization thereof by direct electric current, said stator comprising a mass of metal particles.

11. The apparatus of claim 10 wherein said stator comprising a mass of metal particles has a density equal to at least about 95% of the theoretical density of a solid metal mass.

12. The apparatus of claim 10 wherein reduced eddy current effects are obtained during operation relative to the operation of a similar apparatus in which a solid metal mass is used in place of the mass of metal particles in the stator.

13. The apparatus of claim 10 which comprises at least one of a plurality of said stators and a plurality of rotors.

14. The apparatus of claim 10 wherein said stator includes a plate configured to be substantially flat and having a first end surface, a substantially opposing second end surface and a peripheral surface therebetween, and the plurality of spaced apart projections extend from said second end surface away from said plate toward said rotor.

15. The apparatus of claim 14 wherein each of said slots having a substantially constant dimension between the two projections which define the slot.

16. A pump comprising:

a pump casing having an inlet and an outlet;

an impeller having a rotary axis and being rotatably mounted within said pump casing for rotation about said rotary axis, said impeller being configured and positioned relative to said pump casing so that the rotation of said impeller is effective to urge fluid from said inlet to flow through said outlet;

a rotor coupled to and rotatable with said impeller, and including a single side generally flat array of a plurality of permanent magnetic poles; and a stator spaced apart from and generally facing said single sided generally flat array, said stator including a plurality of spaced apart projections starting at a peripheral surface of the stator and defining a plurality of slots therebetween, each of said slots having a length orthogonally oriented relative to a distance between two projections defining the slot, and said stator having a plurality of magnetic windings positioned around said projections and substantially nonparallel to the length of said slots, said magnetic windings being adapted to effect rotation of said rotor and said impeller upon energization thereof by direct electrical current, said stator comprising a mass of metal particles.

17. The pump of claim 16 wherein said stator comprising a mass of metal particles has a density equal to at least about 95% of the theoretical density of a solid metal mass.

18. The pump of claim 16 wherein reduced eddy current effects are obtained during operation relative to the operation of a similar pump in which a solid metal mass is used in place of the mass of metal particles in the stator.

19. The pump of claim 16 which comprises at least one of a plurality of said stators and a plurality of said rotors.

20. The pump of claim 16 wherein said stator includes a plate configured to be substantially flat and having a first end surface, a substantially opposing second end surface and a peripheral surface therebetween, and the plurality of spaced apart projections extend from said second end surface away from said plate toward said rotor.

21. The pump of claim 20 wherein each of said slots having a substantially constant dimension between the two projections which define the slot.

* * * * *